United States Patent
Rison et al.

(10) Patent No.: US 9,781,566 B1
(45) Date of Patent: Oct. 3, 2017

(54) APPARATUS, SYSTEM AND METHOD OF ESTIMATING A DISTANCE BETWEEN A FIRST STATION AND A SECOND STATION

(71) Applicant: SAMSUNG ELECTRONICS CO., LTD., Suwon-Si, Gyeonggi-Do (KR)

(72) Inventors: Mark G. Rison, Cambridge (GB); Alexander Thoukydides, Cambridgeshire (GB)

(73) Assignee: SAMSUNG ELECTRONICS CO., LTD., Suwon-si, Gyeonggi-Do (KR)

(*) Notice: Subject to any disclaimer, the term of this patent is extended or adjusted under 35 U.S.C. 154(b) by 0 days.

(21) Appl. No.: 15/251,085

(22) Filed: Aug. 30, 2016

(51) Int. Cl.
  H04W 24/00 (2009.01)
  H04W 4/02 (2009.01)
  H04L 12/26 (2006.01)
  H04W 84/12 (2009.01)

(52) U.S. Cl.
  CPC ......... H04W 4/023 (2013.01); H04L 43/0864 (2013.01); *H04W 84/12* (2013.01)

(58) Field of Classification Search
  CPC .... H04W 4/023; H04W 84/12; H04L 43/0864
  See application file for complete search history.

(56) References Cited

U.S. PATENT DOCUMENTS

| | | | | |
|---|---|---|---|---|
| 2014/0213193 A1* | 7/2014 | Zhang | ................... | G01S 11/02 455/67.11 |
| 2014/0355462 A1* | 12/2014 | Aldana | .................... | G01S 5/00 370/252 |
| 2015/0133147 A1* | 5/2015 | Prechner | ................... | G01S 5/14 455/456.1 |
| 2015/0234034 A1* | 8/2015 | Ben-Haim | ................. | G01S 5/10 455/456.1 |
| 2015/0264530 A1* | 9/2015 | Prechner | ............... | H04W 4/025 455/456.2 |
| 2016/0088497 A1* | 3/2016 | Segev | ................... | H04W 24/02 370/252 |
| 2016/0150500 A1* | 5/2016 | Agrawal | ............... | H04W 64/00 370/329 |
| 2016/0234704 A1* | 8/2016 | Aldana | ............... | H04L 43/0864 |
| 2016/0262037 A1* | 9/2016 | Hsu | ....................... | H04L 5/0055 |
| 2016/0366548 A1* | 12/2016 | Wang | .................... | H04W 64/00 |
| 2016/0366606 A1* | 12/2016 | Steiner | .................. | H04W 24/10 |

* cited by examiner

*Primary Examiner* — Ajit Patel
(74) *Attorney, Agent, or Firm* — F. Chau & Associates, LLC

(57) ABSTRACT

A method of determining a station distance includes a station transmitting a first message including a message frame; the station measuring a first departure time of the message frame; the station receiving a second message in response to the first message, the second message including an acknowledgement (Ack) frame including a first arrival time at which the message frame arrived and a second departure time at which the Ack frame departed; the station measuring a second arrival time at which the Ack frame arrived; and the station determining the station distance from the first departure time, the second arrival time, the received first arrival time, and the received second departure time.

18 Claims, 9 Drawing Sheets

US 9,781,566 B1

APPARATUS, SYSTEM AND METHOD OF ESTIMATING A DISTANCE BETWEEN A FIRST STATION AND A SECOND STATION

BACKGROUND

1. Technical Field

Exemplary embodiments of the present inventive concept relate to estimating a distance between stations.

2. Discussion of Related Art

Outdoor navigation is widely deployed thanks to the development of various global navigation-satellite systems (GNSS), such as Global Positioning System (GPS). Recently, there has been a lot of focus on indoor navigation. This field differs from outdoor navigation since the indoor environment does not enable the reception of signals from GNSS satellites. As a result, a lot of effort is being directed toward solving indoor navigation problems.

A current approach for indoor navigation includes a Time-of-Flight (ToF) measurement method. The ToF may be defined as the time it takes a signal to propagate from a first station, e.g., a user ("client") mobile device, to a second station, e.g., an access point (AP), and back to the first station. A distance between the first and second stations may be calculated based on the ToF value.

However, the current approach has significant scheduling and medium overhead, as well as storage overhead. Thus, there is a need for methods and systems that can estimate the distance, which reduce these overheads.

SUMMARY

According to an exemplary embodiment of the inventive concept, a method of determining a station distance includes: wirelessly transmitting, by a station, a first message including a message frame; measuring, by the station, a first departure time of the message frame; wirelessly receiving, by the station, a second message in response to the first message, the second message comprising an acknowledgement (Ack) frame including a first arrival time at which the message frame arrived and a second departure time at which the Ack frame departed; measuring, by the station, a second arrival time at which the Ack frame arrived; and determining, by the station, the station distance from the first departure time, the second arrival time, the received first arrival time, and the received second departure time.

According to an exemplary embodiment of the inventive concept, a method of determining a station distance includes: wirelessly transmitting, by the station, a first message including a fine timing measurement (FTM) frame; measuring, by the station, a first departure time at which the FTM departed and a first arrival time at which an acknowledgement (Ack) frame arrives, the Ack frame indicating that the Ack frame does not include arrival or departure times; wirelessly receiving, by the station, a second message including a second arrival time at which the FTM frame arrived and a second departure time at which the Ack frame departed; determining, by the station, the distance from the first departure time, the first arrival time, the received second arrival time, and the received second departure time.

According to an exemplary embodiment of the inventive concept, a method of determining a station distance includes: wirelessly transmitting, by the station, a first message including a first fine timing measurement (FTM) frame; measuring, by the station, a first departure time of the first FTM frame and a first arrival time at which a first acknowledgement (Ack) frame arrived in response to the first message; wirelessly transmitting, by the station, a second message including a second FTM frame; wirelessly receiving, by the station, a third message including a second Ack frame comprising a second arrival time at which the first FTM frame arrived and a second departure time at which the first Ack frame departed; and determining, by the station, the distance from the first departure time, the first arrival time, the received second arrival time and the received second departure time.

According to an exemplary embodiment of the inventive concept, a device configured to enable a station to calculate a station distance includes: a receiver configured to wirelessly receive a message frame from a station; a processor configured to determine an arrival time at which the message frame arrived, determine a departure time at which an acknowledgement (Ack) frame is to depart, and insert the arrival time and the departure time into the Ack frame; and a transmitter configured to wirelessly transmit the Ack frame to the station in response to the message frame.

According to an exemplary embodiment of the inventive concept, a device configured to determine a station distance includes: a transmitter configured to wirelessly transmit a first message including a message frame; a receiver configured to wirelessly receive a second messaging in response to the first message, the second message comprising an acknowledgement (Ack) frame including a first arrival time at which the message frame arrived and a first departure time at which the Ack frame departed; and a processor configured to determine a second departure time at which the message frame was transmitted, extract the first arrival time and the first departure time from the Ack frame; determine an second arrival time of the Ack frame, and calculate the distance using the received first arrival time, the received first departure time, the determined second departure time, and the second determined arrival time.

According to an exemplary embodiment of the inventive concept, a method of determining a station distance includes: wirelessly transmitting, by a station, a first message including a message frame; measuring, by the station, a first departure time of the message frame; wirelessly receiving, by the station, a second message in response to the first message, the second message comprising a MAC protocol data unit (MPDU) comprising a first arrival time at which the message frame arrived and a second departure time at which a frame including the MPDU departed; measuring, by the station, a second arrival time at which the second message is received; and determining, by the station, the station distance from the measured first departure time, the received first arrival time, the received second departure time, and the measured second arrival time.

BRIEF DESCRIPTION OF THE DRAWINGS

The present inventive concept will become more apparent by describing in detail exemplary embodiments thereof with reference to the attached drawings, in which.

DETAILED DESCRIPTION

Figure 1:
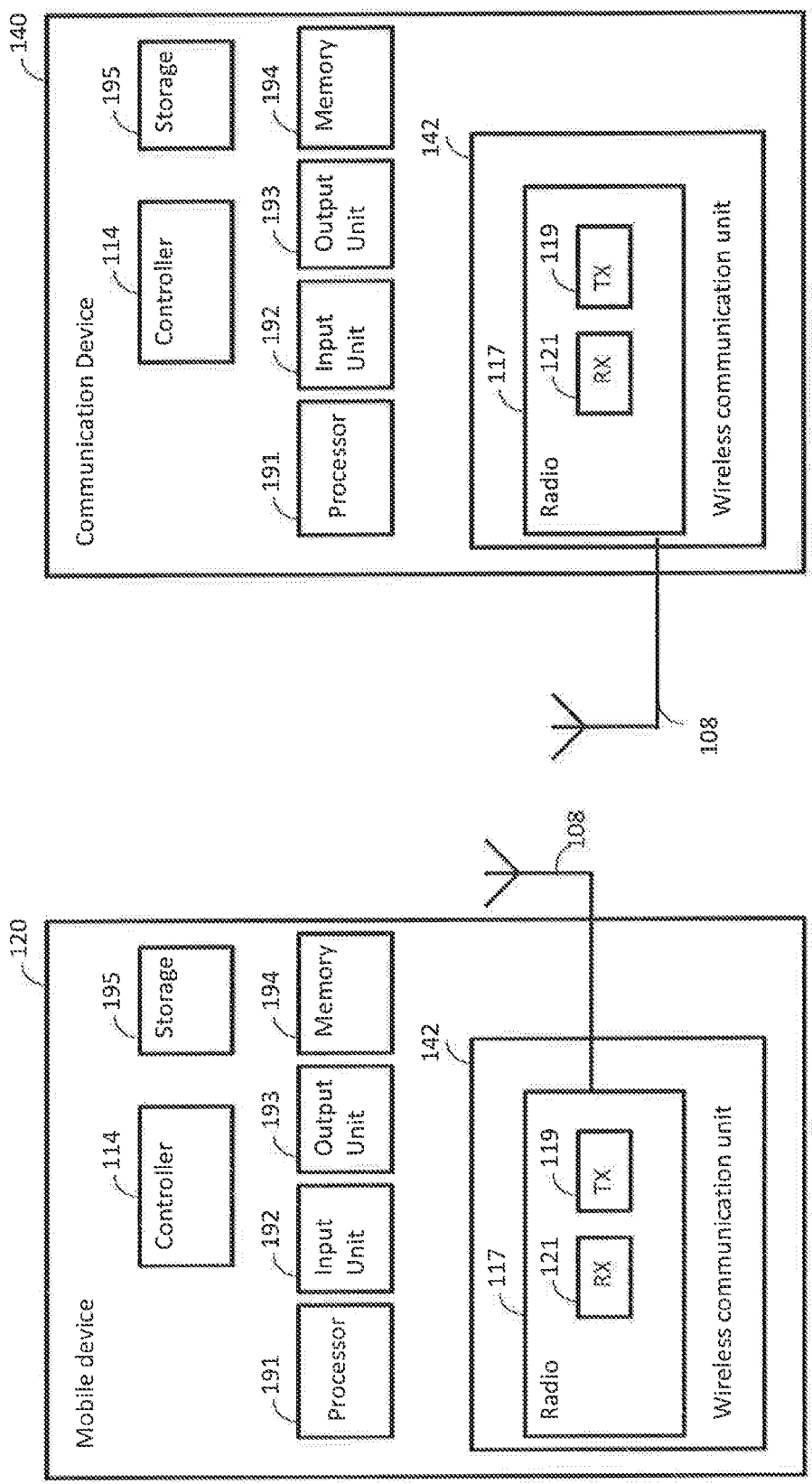
FIG. 1 is a block diagram illustrating a system in accordance with an exemplary embodiment of the present inventive concept.

Hereinafter, exemplary embodiments of the inventive concept in conjunction with accompanying drawings will be described. Below, details, such as detailed configurations and structures, are provided to aid a reader in understanding embodiments of the inventive concept. Therefore, embodiments described herein may be variously changed or modified without departing from embodiments of the inventive concept.

Modules in the drawings or the following detailed description may be connected with other modules in addition to the components described in the detailed description or illustrated in the drawings. Each connection between the modules or components may be a connection by communication or may be a physical connection.

FIG. 1 is a block diagram illustrating a system in accordance with an exemplary embodiment of the inventive concept.

Referring to FIG. 1, the system may include one or more wireless communication devices capable of communicating content, data, information and/or signals via a wireless channel or wireless medium. For example, the system may include one or more mobile devices, e.g., a mobile device 120, and/or one or more wireless communication devices, e.g., wireless communication device 140.

Exemplary embodiments of the inventive concept provide devices capable of implementing the IEEE 802.11 standard and intended future variations of that standard as discussed below. In exemplary embodiments, the devices may include one or more client stations (STAs), and one or more access points (APs). For example, device 120 may perform the functionality of a client STA and device 140 may perform the functionality of an AP, e.g., a Wi-Fi AP, a router, a soft AP, or a Wi-Fi Direct group owner.

In exemplary embodiments, the device 140 may be a mobile device or a non-mobile device (e.g., a static device).

In exemplary embodiments, device 120 or device 140 may be, for example, a personal computer (PC), a desktop computer, a mobile computer, a laptop computer, a notebook computer, a tablet computer, an Ultrabook computer, a mobile internet device (MID), a server computer, a handheld computer, a handheld device, a personal data assistant (PDA) device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a personal communication service (PCS) device, a PDA device which incorporates a wireless communication device, a mobile or portable GPS device, a digital video broadcasting (DVB) device, a relatively small computing device, a non-desktop computer, a context-aware device, a video device, an audio device, an A/V device, a Set-Top-Box (STB), a video source, an audio source, a video sink, an audio sink, a stereo tuner, a broadcast radio receiver, a flat panel display, a Personal Media Player (PMP), a data source, a data sink, User Equipment (UE), a "Carry Small Live Large" (CSLL) device, an Ultra Mobile Device (UMD), an Ultra Mobile PC (UMPC), a device that supports Dynamically Composable Computing (DCC), a wireless tag, a tracker device, a video device, an audio device, an A/V device, a gaming device, a media player, or a Smartphone.

In an exemplary embodiment, the devices 120 and 140 communicate with one another through a wireless radio frequency channel such as a cellular channel, a Wireless Fidelity (Wi-Fi) channel, or an infrared (IR) channel. Further, one or more elements of the system may optionally be capable of communicating over any suitable wired communication links.

In exemplary embodiments, the device 120 and/or device 140 may include wireless communication units, to perform wireless communication between device 120 and device 140 and/or with one or more other wireless communication devices over the wireless channel. For example, device 120 or device 140 may include a wireless communication unit 142.

In exemplary embodiments, the wireless communication units may include one or more radios. For example, wireless communication unit 142 may include a radio 117, e.g., including one or more wireless transmitters, receivers and/or transceivers able to send and/or receive wireless communication signals, RF signals, frames, blocks, transmission streams, packets, messages, data items, and/or data. In one example, the radios may include modulation elements, demodulation elements, amplifiers, analog to digital and digital to analog converters, or filters. In one example, radio 117 may include at least one transmitter (Tx) 119 and at least one receiver (Rx) 121. For example, wireless communication unit 142 may include or may be implemented as part of a wireless Network Interface Card (NIC). While FIG. 1 shows that device 120 and device 140 each include the same internal components, embodiments of the inventive concept are not limited thereto. For example, any one of devices 120 and 140 may omit one or more of the illustrated components or include additional components in alternate embodiments.

In exemplary embodiments, the wireless communication units may include, or may be associated with, one or more antennas. For example, wireless communication unit 142 may be associated with one or more antennas 108.

The antennas 108 may include any type of antennas suitable for transmitting and/or receiving wireless communication signals, blocks, frames, transmission streams, packets, messages and/or data. For example, antennas 108 may include any suitable configuration, structure and/or arrangement of one or more antenna elements, components, units, assemblies and/or arrays. Antennas 108 may include, for example, antennas suitable for directional communication, e.g., using beamforming techniques. For example, antennas 108 may include a phased array antenna, a multiple element antenna, a set of switched beam antennas, and/or the like. In some embodiments, antennas 108 may implement transmit and receive functionalities using separate transmit and receive antenna elements. In some embodiments, antennas 108 may implement transmit and receive functionalities using common and/or integrated transmit/receive elements.

In exemplary embodiments, the mobile device 120 and/or device 140 may also include, for example, a processor 191, an input unit 192, an output unit 193, a memory unit 194, and a storage unit 195. The devices 120 or 140 may optionally include other suitable hardware components and/or software components. In exemplary embodiments, some or all of the components of device 120 or device 140 may be enclosed in a common housing or packaging, and may be interconnected or operably associated using one or more wired or wireless links. In other embodiments, components of the device 120 or device 140 may be distributed among multiple or separate devices.

The processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, the processor 191 executes instructions, for example, of an Operating System (OS) of the mobile device 120 and/or of one or more suitable applications.

The memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 120.

The input unit 192 includes, for example, a keyboard, a keypad, a mouse, a touch-screen, a touch-pad, a track-ball, a stylus, a microphone, or other suitable pointing device or input device. The output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In exemplary embodiments, the device 120 and/or device 140 may be located in an indoor environment, for example, a mall, a building, an office and/or the like. In other embodiments, device 120 and/or device 140 may be located in any other environment, e.g., an indoor and/or an outdoor location.

In an exemplary embodiment, the devices 120 and 140 operate in accordance with a modified version of the IEEE 802.11 standard to determine time-of-flight and location, according to exemplary embodiments of the inventive concept.

Figure 2:
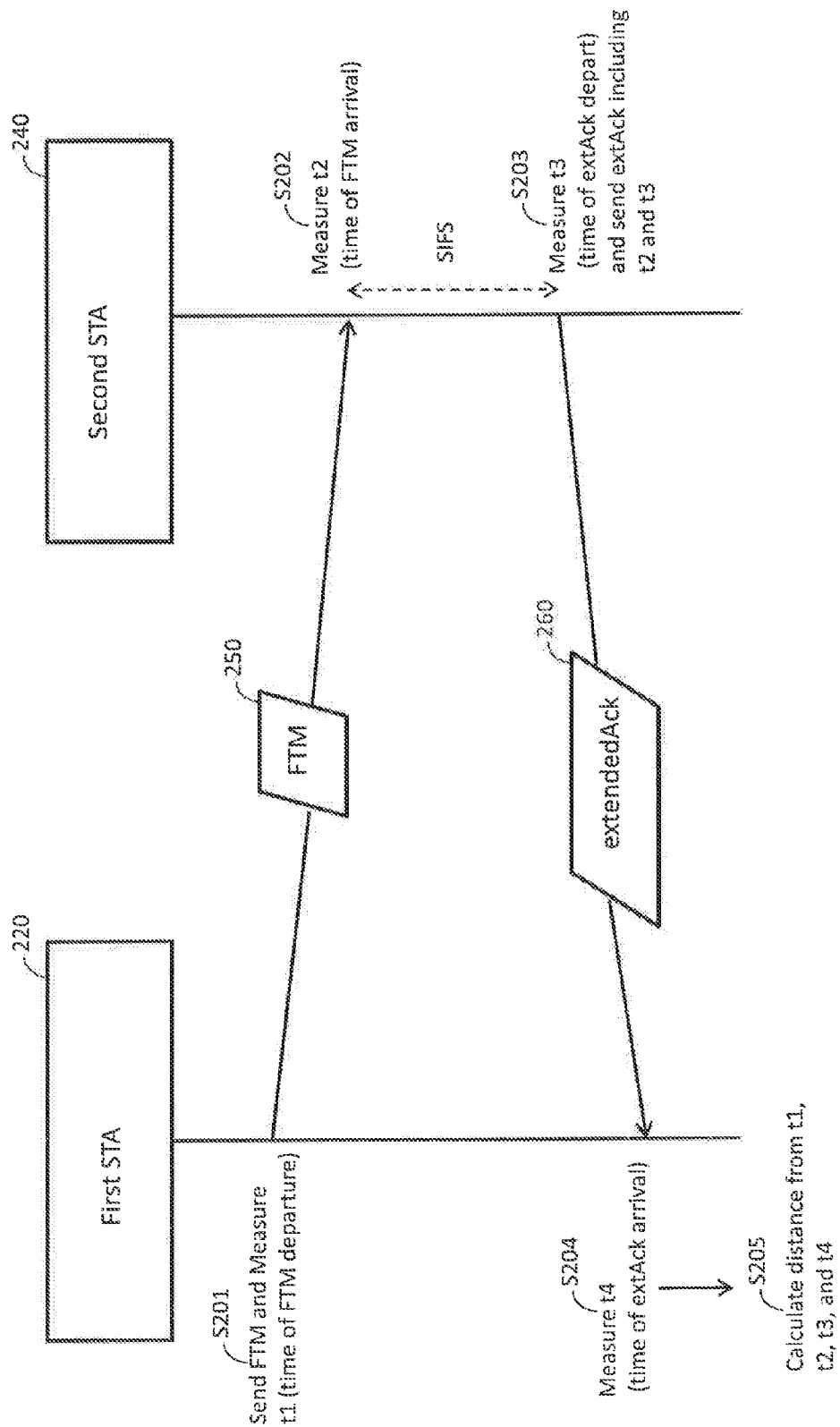
FIG. 2 illustrates a method of calculating a distance according to an exemplary embodiment of the inventive concept.

FIG. 2 illustrates a first station (STA) 220 calculating a distance from a second station 240 using a method according to an exemplary embodiment of the inventive concept. In an embodiment, the first station 220 is a non-AP STA implemented by device 120 and the second station 240 is an access point (AP) implemented by device 140. Portions of the method may be executed by a processor 191 of device 120 or device 140.

Referring to FIG. 2, the method includes the first station 220 sending a fine timing measurement (FTM) frame 250 to the second station 240 and measuring the FTM departure time t1 at which the FTM frame 250 departed (S201). The first station 220 may measure the FTM departure time t1 using its own local internal clock. For example, the first station 220 may include a signal generator configured to generate a local reference clock signal, where the FTM departure time t1 is measured with respect to the local reference clock signal of the first station 220. For example, the first station 220 may send the FTM frame 250 using transmitter 119, and the second station 240 may receive the frame using receiver 121. The first station 220 further temporarily stores the FTM departure time t1 so it can be used for a future time of travel calculation. For example, when the first station 220 is implemented by device 120, it can store the FTM departure time t1 in memory 194 or storage 195.

Figure 3:
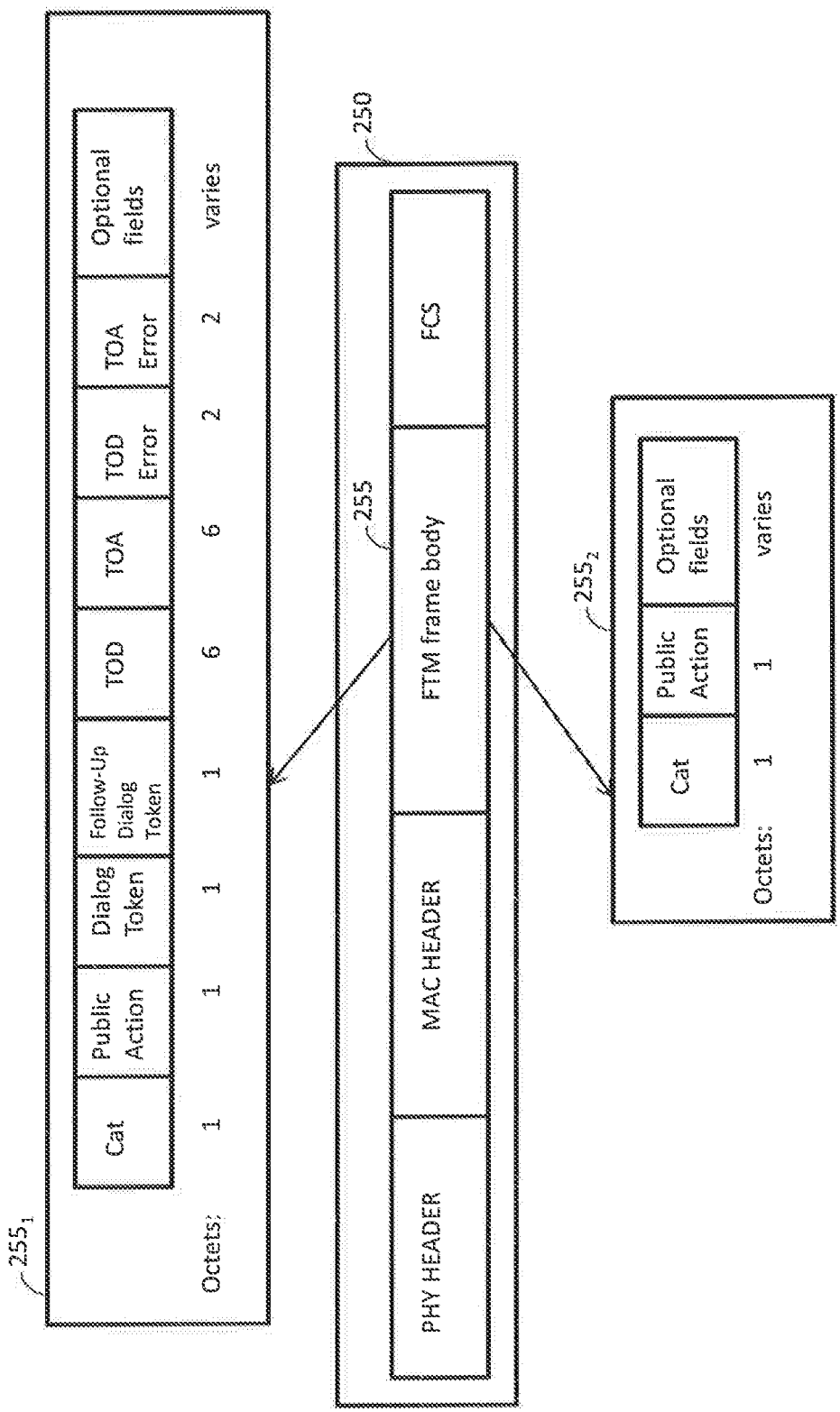
FIG. 3 illustrates a frame used in the above method according to an exemplary embodiment of the inventive concept.

FIG. 3 illustrates the FTM frame 250 as an IEEE 802.11 message that includes a PHY header, a media access controller (MAC) header, a FTM frame body 255, and a frame check sequence (FCS) and additionally shows different versions $255_1$ and $255_2$ of the FTM frame body 255 according to embodiments of the inventive concept. The MAC header may include type and/or subtype fields that indicate the message is a FTM frame. In the first version $255_1$, the FTM frame body 255 includes a category field that may be set to a value for Public, and a Public Action field set to indicate a Fine Timing Measurement Frame, a Dialog Token field, a Follow-Up Dialog Token field, a time of departure (TOD) field, a maximum TOD error field, and a maximum TOA error field. FIG. 3 also shows a second version $255_2$ of the FTM frame body 255, where the Dialog Token field, the Follow Up Token field, the TOD field, the TOA field, the TOD error field, and the TOA error field are omitted. The second version $255_2$ requires less data to communicate, and thus may be preferred when bandwidth is limited and improved response times are needed.

In an exemplary embodiment of the inventive concept, either version of the FTM frame may additionally include various optional fields such as an LCI Report field, a Location Civic Report field, or a Fine Timing Measurement Parameters field, which may have variable lengths.

Referring back to FIG. 2, upon receipt of the FTM frame 250, the second station 240 measures the FTM arrival time t2 at which the FTM frame arrived (S202). The second station 240 may measure the FTM arrival time t2 using its own local internal clock that is different from the internal clock of the first station 220. For example, the second station 240 may include a signal generator configured to generate a local reference clock signal, where the FTM arrival time t2 is measured with respect to the local reference clock signal of the second station 240. The FTM arrival time t2 may correspond to the time at which the second station 240 received the PHY header of the message the FTM frame 250 is sent within. The second station 240 may temporarily store the FTM arrival time t2 until it is time to send an extended acknowledgement (Ack) frame 260 (see FIG. 4). For example, when the second station 240 is implemented by device 140, the second station 240 may store the FTM arrival time t2 into memory 194 or storage 195.

Then, after a short interface space (SIFS) time period elapses, the second station 240 determines an extended Ack departure time t3 at which an extended acknowledgement (Ack) frame 260 is to depart, and sends the extended Ack frame 260 including the FTM arrival time t2 and the extended Ack departure time t3 to the first station 220

Figure 4:
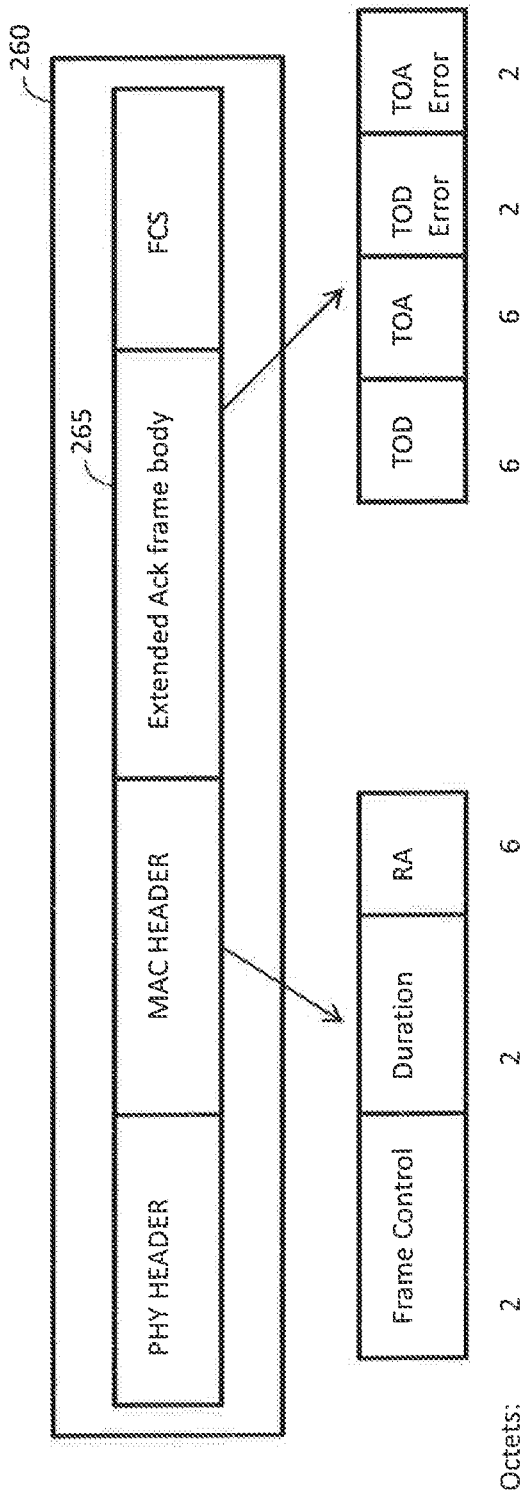
FIG. 4 illustrates a frame used in the above method according to an exemplary embodiment of the inventive concept.

(S203). The second station 240 may determine the extended Ack departure time t3 using its local reference clock signal. FIG. 4 shows an example of an extended Ack frame 260 that is sent to the first station 220 in response to the FTM 250 frame, according to an exemplary embodiment of the inventive concept. The MAC header includes a frame control field, a duration field, and a receiver address (RA) field. The RA indicates the address of the device to receive the extended Ack frame 260. The types and/or subtype fields in the MAC header of the extended Ack frame 260 may be set to values that enable the receiving device to interpret the frame as an extended Ack as opposed to a conventional IEEE 802.11 Ack that does not include timing information. The extended Ack frame body 265 of the extended Ack frame 260, according to an exemplary embodiment of the inventive concept, includes a TOD field, a TOA field, a TOD error field, and a TOA error field, which differs from the conventional IEEE 802.11 Ack frames, which do not include such fields.

In an alternate embodiment, the TOD error field and the TOA error field are omitted from the extended Ack frame 260, since they are typically constant. In this embodiment, the TOD error and TOA error are provided in a Beacon/Probe Response/Association Response, rather than part of every FTM exchange. To join a network, a station sends a Probe Request message and waits for a Probe Response message, or just waits for a Beacon message. Thus, the TOD error and/or TOA error can be sent in the Probe Request message, the Probe Response message, or the Beacon message. A station can become associated with another station by sending an Association Request message to the other station and then waiting for the Association Response message. Thus, the TOD error and/or TOA error can be sent in the Association Request message or the Association Response message.

In an embodiment of the inventive concept, the TOD field stores the extended Ack departure time t3 and the TOA field stores the FTM arrival time t2. The TOD error field contains an upper bound for the error in the value specified in the TOD field. The TOA error field contains an upper bound for the error in the value specified in the TOA field. The order of the TOD, TOA, TOD error, and TOD error in the Ack frame body 265 may vary in other embodiments, assuming the receive side is also aware of this new ordering. While FIG. 4, shows that the extended Ack frame body 265 is located between the MAC header and the FCS, embodiments of the inventive concept are not limited to this particular position.

Referring back to FIG. 2, upon receipt of the extended Ack frame 260, the first station 220 measures the extended Ack arrival time t4 at which the extended Ack frame 260 arrived (S204). The first station 220 may measure the extended Ack arrival time t4 using its local reference clock signal, which need not be synchronized with the local reference clock signal of the second station 240.

Then, the first station 220 calculates a distance D1 using the FTM departure time t1, the FTM arrival time t2 received in the extended Ack frame 260, the extended Ack departure time t3 received in the extended Ack frame 260, and the measured extended Ack arrival time t4. (S205). The distance D1 may be calculated using Equation 1 as follows:

$$D1=((t2-t1)+(t4-t3))*c/2 \quad [1]$$

where c is the speed of light, which is approximately $3\times10^8$ m/s.

The distance D1 may be used along with other distances calculated from interacting with other access points, and the known locations of the access points to estimate the location of the first station 220. For example, the first station 220 may delay the calculation of its location until it calculates three or more distances from three or more different receptive stations (e.g., access points).

In an embodiment, a type within the frame control field of the MAC header in the extended Ack frame 260 is sent within, is set to a value that enables the first station 220 to interpret the message as including an extended Ack frame 260 containing the measured times t2 and t3 (e.g. Ack+thisMeasure). Thus, the frame sequence of the above method can be represented by FTM-SIFS-(Ack+thisMeasure). In alternate embodiment, the receiver 121 of the first station 220 determines the extended Ack frame 260 additionally includes the measured times t2 and t3 by analyzing the length of the extended Ack frame 260. In this embodiment, the type and/or subtypes of the MAC header may be set to indicate the message is a conventional Ack, but the receiver 121 is designed to look at its length to determine whether it additionally includes the timing information. For example, if the receiver 121 determines a received message posing as an Ack is larger than a pre-defined threshold length or is exactly a certain length, the receiver 121 could conclude the Ack includes the measured times t2 and t3.

Figure 5:
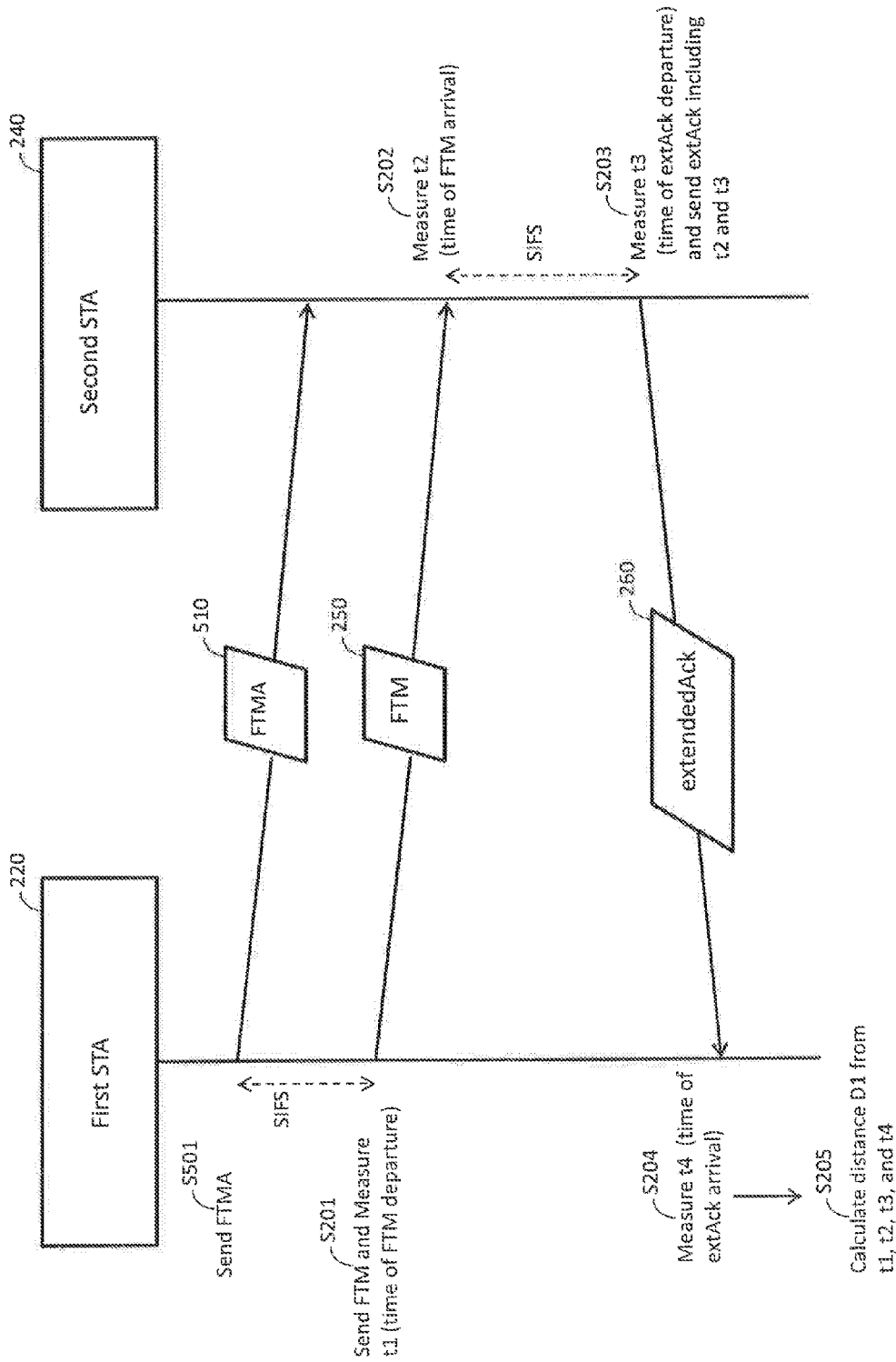
FIG. 5 illustrates a method of calculating a distance according to an exemplary embodiment of the inventive concept.

The above assumes that the second station 240 has sufficient hardware to determine the arrival time t2 and the departure time t3 quickly. However, if the second station 240 needs more time to prepare, an alternate embodiment of the inventive concept relies on an additional announcement frame FTMA 510 as shown in FIG. 5. In this embodiment, prior to sending the FTM frame 250 (i.e., S201), the first station 220 sends the FTMA frame 510 to the second station 240 to announce that the first station 220 is planning to next send the FTM frame 250 (S501). After sending the FTMA frame 510, the first station 220 pauses a time period SIFS, and then sends the FTM frame 250. Then, the frame sequence becomes FTMA-SIFS-FTM-SIFS-(Ack+thisMeasure).

Figure 6:
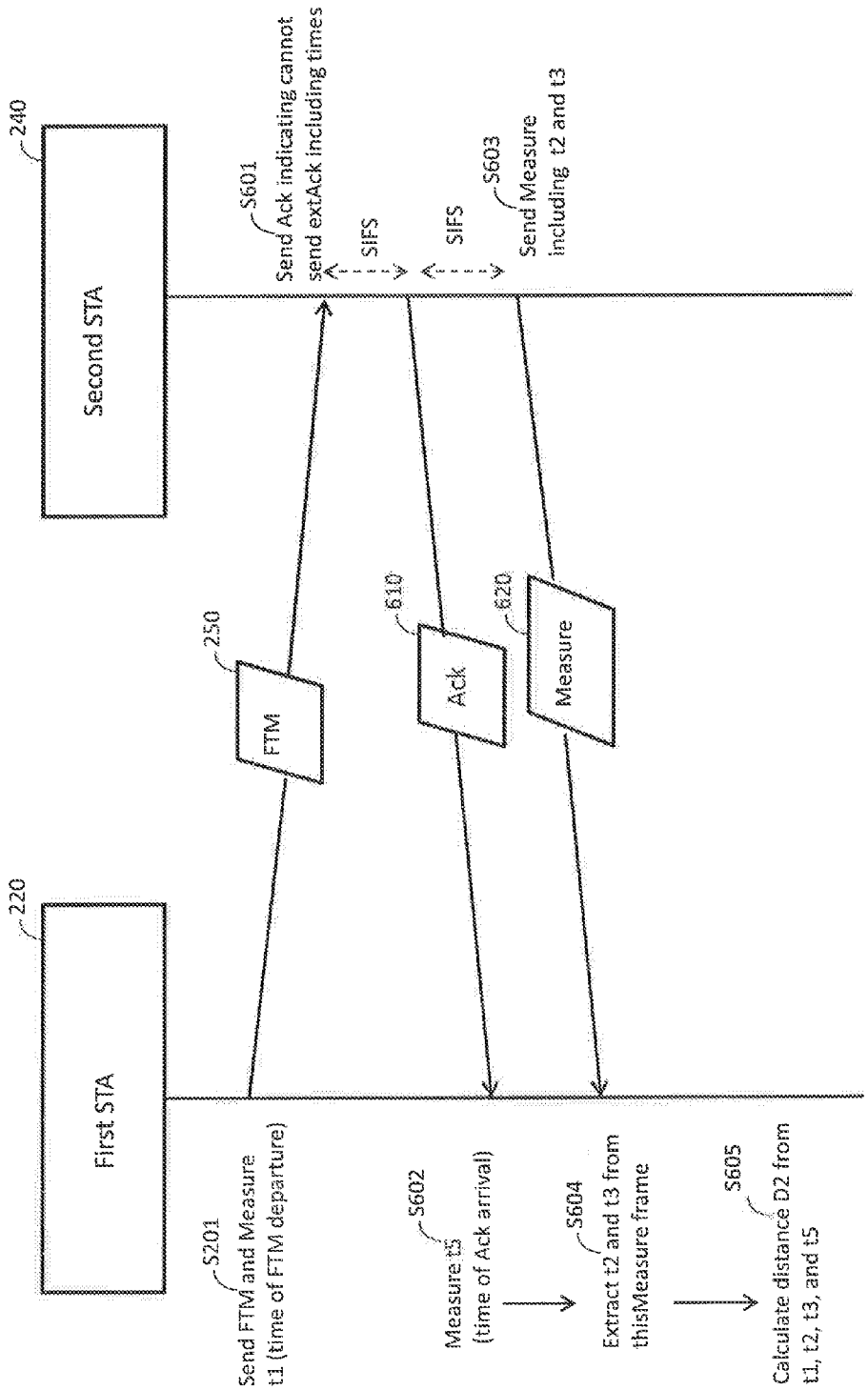
FIG. 6 illustrates a method of calculating a distance according to an exemplary embodiment of the inventive concept.

In an embodiment of the inventive concept as shown in FIG. 6, when the second station 240 is not capable of immediately providing the FTM arrival time t2 and the extended Ack departure time t3 in the extended Ack frame, the second station 240 indicates such in an Ack frame 610 (S601). For example, a bit in the PHY header or the MAC header of the Ack frame 610 is set to indicate that the second station 240 is not capable of using the extended Ack frame that includes the arrival and departure times. Further, this Ack frame 610 differs from the extended Ack frame 260 in that it does not include the TOD, TOA, TOD error, or TOA error. The first station 220 measures an arrival time t5 of the Ack frame 610 (S602). The second station 240 sends a new frame (e.g., Measure frame 620) that includes the arrival time t2 and the departure time t3 (S603). The second station 240 may send the Measure frame 620 before the second station 240 begins its measurement of t5. For example, step S603 may be performed before step S602.

The first station 220 then extracts times t2 and t3 from the Measure frame 620 received from the second station 240 (S604). The first station 220 then calculates a distance D2 from times t1, t2, t3, and t5. The distance D2 may be calculated using Equation 1 by replacing t4 with t5. Then the frame sequence would be FTM-SIFS-Ack-SIFS-Measure. In an alternate embodiment, the frame sequence would be FTMA-SIFS-FTM-SIFS-Ack-SIFS-Measure when the announcement frame FTMA 510 is additionally used.

In an exemplary embodiment, the Ack frame 260 shown in FIG. 2 is replaced with the Measure frame 620 shown in FIG. 6. The frame sequence would then be FTM-SIFS-Measure or FTMA-SIFS-FTM-SIFS-Measure if the announcement frame FTMA 510 is used.

In an exemplary embodiment of the inventive concept (e.g., an always-respond-with-time approach), the second station 240 measures the arrival time of all frames (i.e., any frame (anyFrame) regardless of whether it is the FTM frame 250) and the measures the departure time of the corresponding Ack frame that is to be sent in response, and provides both these times in the Ack frame. In this embodiment, the always-respond-with time approach is only performed if the first station 220 has indicated to the second station 240 that the first station 220 supports such. This would essentially give ranging information "for free": the first station 220 could get location information at the same time as performing normal data or other frame exchanges. This would make the protocol as scalable as IEEE 802.11 itself. The frame sequence would then be anyFrame-SIFS-(Ack+thisMeasure), where anyFrame is an arbitrary frame that results in an Ack frame. Since this would slightly lengthen Ack frames, a bit or other signal could be used in the MAC or PHY header of anyFrame to indicate to the second station 240 whether the first station 220 wishes to receive arrival and departure times (e.g., t2 and t3) in the Ack frame. Alternately, the first station 220 could turn the behavior on or off (i.e., send one management signal to indicate it wants to receive times from now on and another signal to indicate it no longer needs the times).

The first station 220 may be either associated with the second station 240 or unassociated with the second station 240, and similarly associated or unassociated with one or more stations or APs. Since FTM needs to be performed with multiple stations or APs to accurately estimate the location of a station (in order to perform multilateration), the first station 220 might not be associated with a given station or AP. In this case, a bit (e.g., in the FTM frame 250 or the PHY/MAC header) can be used to tell the given station or AP whether to use the extended Ack (e.g., 260) for an unassociated station or AP. Alternatively, a new frame FTMunassoc (e.g., a new Public Action type) could be used for FTM to unassociated station or APs. The use of this frame would indicate to the unassociated station or AP that the extended Ack (e.g., 260) is supported by the first station. The frame sequence would then be FTMunassoc-SIFS-(Ack+thisMeasure).

If the second station 240 cannot do a quick measurement of times t2 and t3, then it would still be possible to avoid the negotiation and scheduling overhead (at the expense of extra frames, though) by having the second station 240 send times t2 and t3 for the previous FTM frame in the Ack that is sent in response to a current FTM frame. The frame sequence would then be FTM-SIFS-(Ack+thisprevMeasure) or FTM-SIFS-Ack-SIFS-prevMeasure, where "Ack+thisprevMeasure" is an Ack frame containing the time measurements (e.g., t2 and t3) for the previous FTM frame, and "prevMeasure" is a new frame carrying the same measurements. This frame sequence may further be combined with use of the announcement frame FTMA 510.

Figure 7:
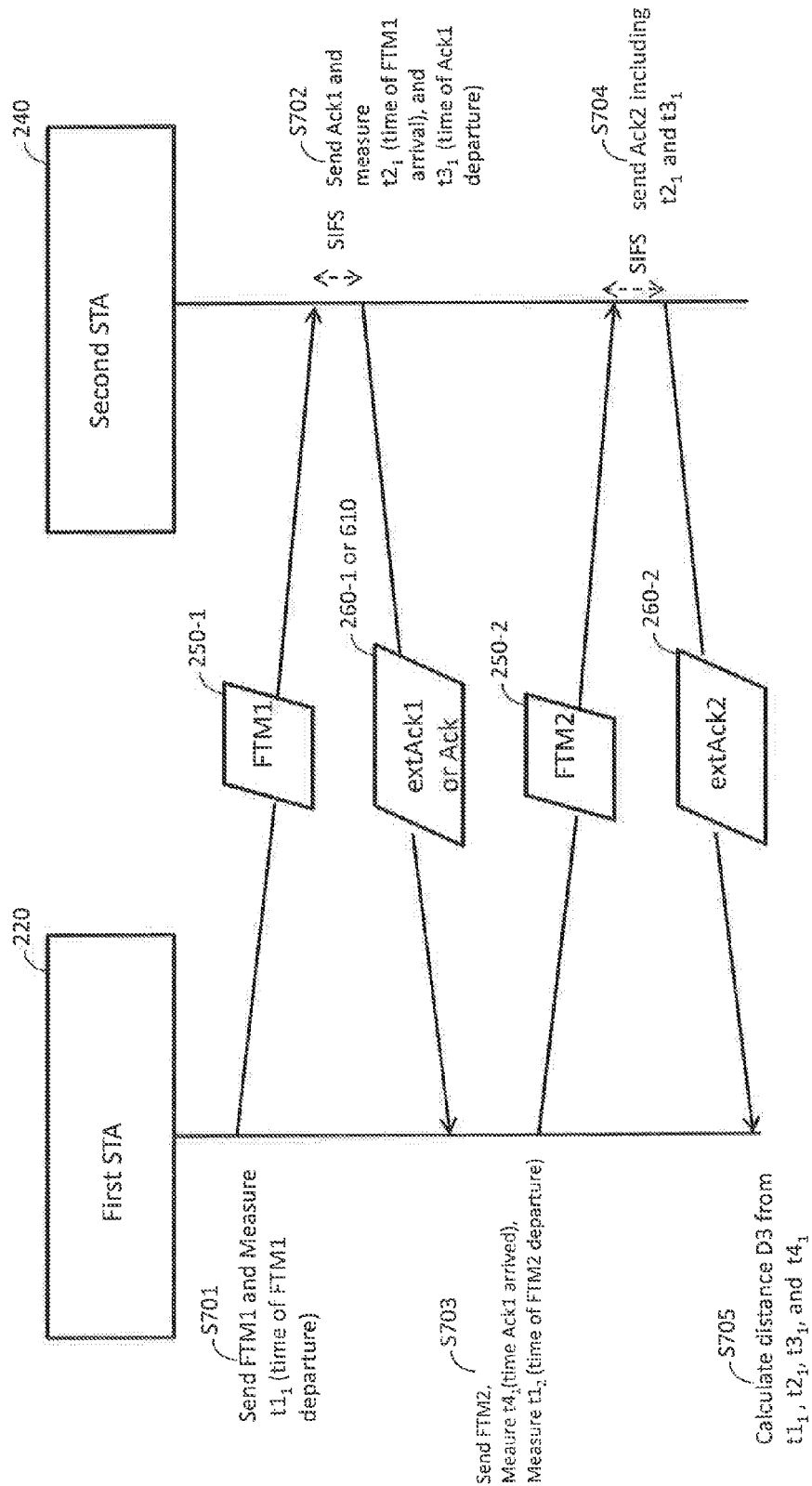
FIG. 7 illustrates a method of calculating a distance according to an exemplary embodiment of the inventive concept.

FIG. 7 illustrates a method of calculating a distance using the previous measure. Referring to FIG. 7, the method includes the first station 220 sending a first FTM1 frame 250-1 and measuring the FTM1 departure time $t1_1$ at which the first FTM1 departed (S701). Upon receipt of the first FTM1 250-1, the second station 240 sends a first extended acknowledgment (Ack1) frame 260-1 and starts determining the time $t2_1$ at which the first FTM1 frame 250-1 arrived and the time $t3_1$ at which the first Ack1 frame 260-1 departed (S702). In an embodiment, the first Ack1 frame 260-1 is replaced with a regular Ack frame 610 that does not include the timing information. If first FTM1 frame 250-1 is the first FTM ever received by the second station 240 from the first station 220, there will be no prior measures, and accordingly, the second station 240 could insert zero TOD and TOA values or invalid TOD and TOA values into the first extended Ack1 frame 260-1 to inform the first station 220 that no prior measures exist. Then, in response to the first extended Ack1 frame 260-1, the first station 220 sends a second FTM2 frame 250-2, measures the Ack1 arrival time $t4_1$ at which the first extended Ack1 frame 260-1 arrived and the FTM2 departure time $t1_2$ at which the second FTM2 250-2 departed (S703). The first FTM 250-1 or the second FTM 250-2 may be implemented using the FTM 250 shown in FIG. 3. It is assumed that the second station 240 completes its determination of $t2_1$ and $t3_1$ prior to the time at which the second FTM2 frame 250-2 is to be sent out. Then in response to receipt of the second FTM2 frame 250-2, the second station 240, having already determined times $t2_1$ and $t3_1$, inserts $t2_1$ and $t3_1$ into a second extended Ack2 frame 260-2 and sends the second extended Ack2 frame 260-2 to the first station 220 (S704). Then, the first station 220 in response to receipt of the second extended Ack2 frame 260-2, calculates a distance D3 using times $t2_1$ and $t3_1$ received in the second extended Ack2 frame 260-2, $t1_1$ calculated at step S701, and $t4_1$ calculated at S703. The distance D3 may be calculated in a similar manner using Equation 1 by replacing t1 with $t1_1$, replacing t2 with $t2_1$, replacing t3 with $t3_1$ and replacing t4 with $t4_1$.

In a further embodiment, the second station 240 is configured to indicate whether it can use the extended Ack frame 260 (e.g., configured to use an Ack that includes the time measures) using an Ack frame that does not include arrival and departure times and reject the request to use the extended Ack frame (e.g., 260) using a new acknowledgment frame (herein referred to as (Ack+unsupported)) when it cannot use the extended Ack frame 260 or can use the extended Ack frame, but is unable to respond with the extended Ack at this time due to a certain reason (e.g., too busy, operating in a special mode, etc.). The frame sequence would then be FTMA-SIFS-Ack-FTM-SIFS-(Ack+thisMeasure) or FTMA-SIFS-(Ack+unsupported). For example, in response to receipt of the announcement frame (e.g., FTMA 510) indicating that the FTM 250 is to be sent next, the second station 240 can respond with a (Ack+unsupported) frame indicating it cannot participate or an Ack frame indicating it can participate.

Figure 8:
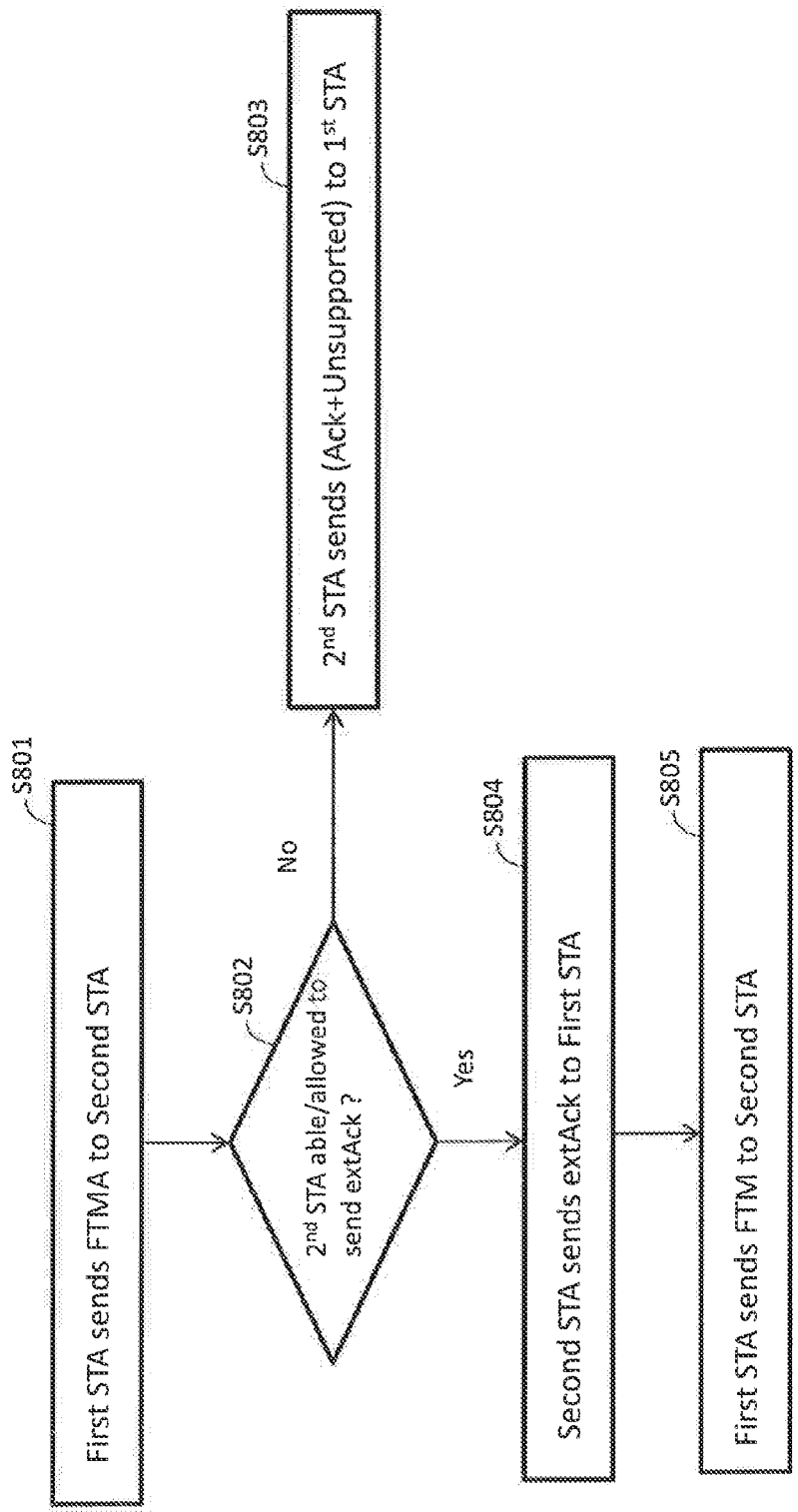
FIG. 8 illustrates a method according to an exemplary embodiment of the inventive concept that may be used by one or more of the above methods.

FIG. 8 illustrates a method according to an exemplary embodiment of the inventive concept that uses the (Ack+Unsupported) frame. Referring to FIG. 8, the method includes a first station (e.g., 220) sending the FTMA (e.g. 510) to a second station (e.g., 240) (S801). The method further includes the second station determining whether it is able or allowed to send the extended Ack frame (e.g., 260) (S802). If the second station determines it is not able to send or is not currently allowed to send the extended Ack frame, the second station sends a (Ack+Unsupported) frame to the first station (S803). If the first station receives the (Ack+Unsupported) frame, it knows that it should not send the FTM 250 next.

If the second station determines it can send the extended Ack frame (i.e., an Ack frame with the departure and arrival times such as 260), the second station sends an Ack frame with the departure and arrival times to the first station (S804). If the first station receives the Ack frame with the times, the first station knows that the second station supports the extended Ack frame (i.e., Ack+thisMeasure), and accordingly the first station sends the FTM to the second station (S805). Then in response to the FTM, the second station responds with the extended Ack frame 260 shown in FIG. 2.

Figure 9:
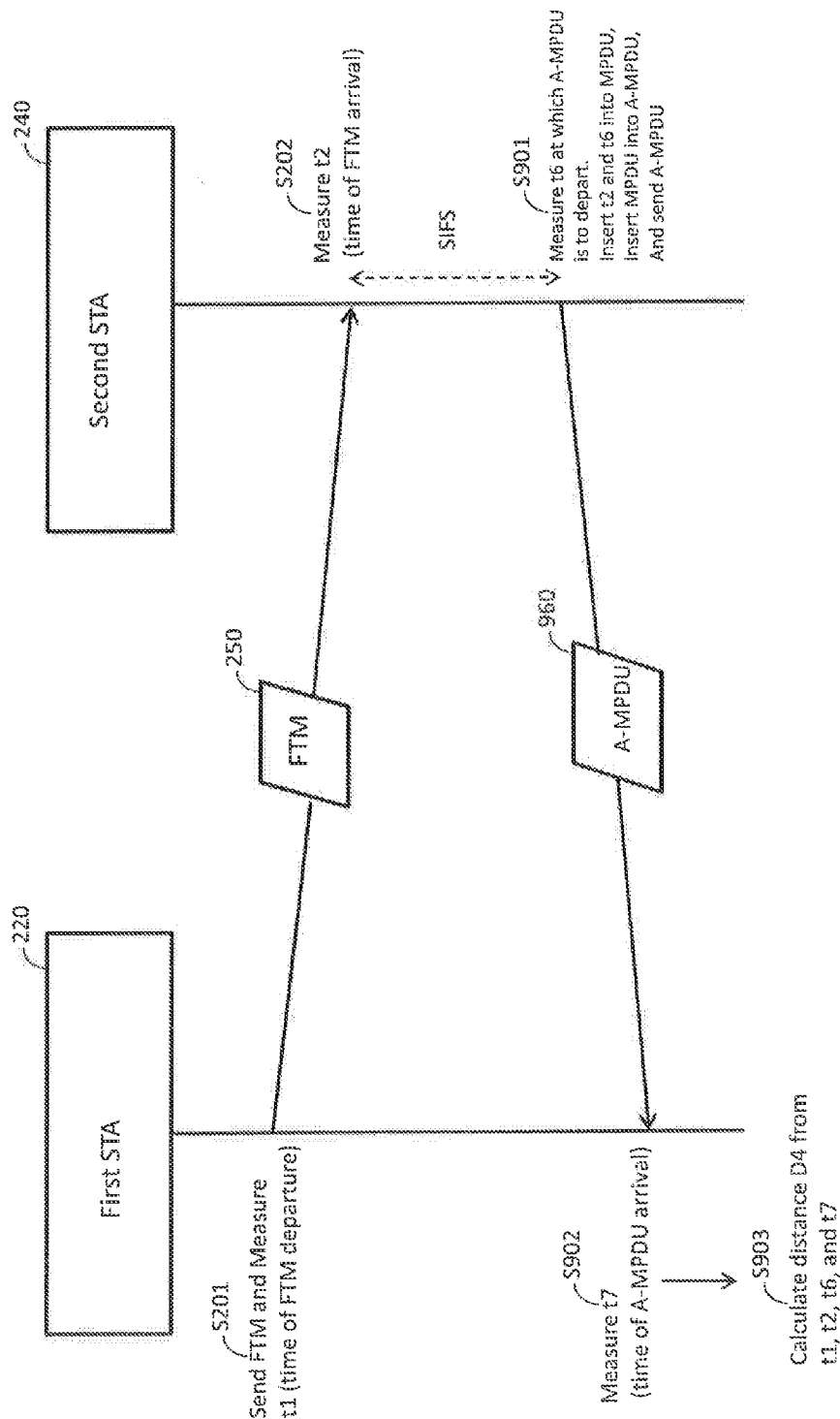
FIG. 9 illustrates a method of calculating a distance according to an exemplary embodiment of the inventive concept.

FIG. 9 illustrates a method of calculating a distance according to an exemplary embodiment of the inventive concept. Similar to the method of FIG. 2, the first station 220 sends a fine timing measurement (FTM) frame 250 to the second station 240 and measures the FTM departure time t1 at which the FTM frame departed (S201), and upon receipt of the FTM frame 250, the second station 240 measures the FTM arrival time t2 at which the FTM frame arrived (S202). Then, different from the method of FIG. 2, the second station 240 measures a time t6 at which an aggregated MAC protocol data unit (A-MPDU) 960 is to depart, inserts times t2 and t6 into an MPDU, inserts the MPDU into the A-MPDU 960, and sends the A-MPDU 960 to the first station 220 (S901). The first station 220 then measures a time t7 at which the A-MPDU 960 arrives (S902). Then the first station 220 calculates its distance D4 from the second station 240 using times t1, t2, t6, and t7 (S903). The distance D4 may be calculated using the above Equation 1 by replacing t4 with t7 and replacing t3 with t6.

In an embodiment, the A-MPDU 960 includes an Ack MPDU first followed by an Action No Ack MPDU that includes the timing information (t6 and t7), also may be referred to as thisMeasure. In an embodiment, the type of the MAC of the Ack MPDU is a first type value and the subtype of the MAC of the Ack MPDU is a first subtype value to indicate to the first station it is an Ack. In an embodiment, the type of the MAC of the Action No Ack MPDU is second type value and the subtype of the MAC of the Action No Ack MPDU is a second subtype value to indicate to the first station it is an Action No Ack MPDU. Then, the frame sequence would be FTM-SIFS-(A-MPDU), where A-MPDU is an A-MPDU with an Ack first and then an Action No Ack MPDU with the timing information. In an embodiment, the A-MPDU 960 is sent in a single PHY protocol data unit (PPDU).

The above methods describe a first station 220 sending various frames to the second station 240 and receiving various frames from the second station 240. When the first station 220 is implemented by device 120, it may use the transmitter 119 of device 120 to send these frames and the receiver 121 of device 120 to receive these frames. When the second station 240 is implemented by device 140 it may use the transmitter 119 of device 140 to send the above described various frames to the first station 220 and a receiver 121 device 140 to receive the above described various frames from the first station 220.

In an exemplary embodiment, the above described transmitters and receivers are designed to provide wireless local area network (WLAN) computer communication in frequency bands supported by IEEE 802.11 such as 900 MHz, and 2.4, 3.6, 5, and 60 GHz frequency bands, but is not limited thereto.

The above-described methods may be tangibly embodied on one or more computer readable medium(s) (i.e., program storage devices such as a hard disk, magnetic floppy disk, RAM, ROM, CD ROM, Flash Memory, etc., and executable by any device or machine comprising suitable architecture, such as a general purpose digital computer having a processor, memory, and input/output interfaces).

Although the present inventive concept has been described in connection with exemplary embodiments thereof, those skilled in the art will appreciate that various modifications can be made to these embodiments without substantially departing from the principles of the present inventive concept.

What is claimed is:

1. A method of determining a station distance between a first station and a second station, the method comprising:
    wirelessly transmitting, by the first station, a first message including a message frame, to the second station;
    measuring, by the first station, a first departure time of the message frame at which the message frame departed from the first station;
    wirelessly receiving, by the first station, a second message from the second station in response to the first message, the second message comprising an acknowledgement (Ack) frame including a first arrival time at which the message frame arrived at the second station and a second departure time at which the Ack frame departed from the second station;
    measuring, by the first station, a second arrival time at which the Ack frame arrived at the first station; and
    determining, by the first station, the station distance from the first departure time, the second arrival time, the received first arrival time, and the received second departure time,
    wherein the message frame is an IEEE 802.11 fine timing measurement (FTM) frame modified to exclude a time of departure (TOD) field and a time of arrival (TOA) field.

2. The method of claim 1, wherein the FTM frame requests that the first arrival time and the second departure time be placed in the Ack frame.

3. The method of claim 1, wherein the IEEE 802.11 FTM frame is further modified to exclude at least one Dialog Token field.

4. The method of claim 1, wherein the IEEE 802.11 FTM frame is further modified to exclude a TOD error field that indicates an amount of error in the second departure time, and modified to exclude a TOA error field frame that indicates an amount of error in the first arrival time.

5. The method of claim 2, wherein the Ack frame is an IEEE 802.11 Ack frame that is modified to include a time of departure TOD field and a time of arrival TOA field.

6. The method of claim 5, wherein the TOD field stores the second departure time and the TOA field stores the first arrival time.

7. The method of claim 5, wherein the IEEE 802.11 Ack frame is modified to include a TOD error field that indicates an amount of error in a value stored in the TOD field and modified to include a TOA error field that indicates an amount of error in a value stored in the TOA field.

8. The method of claim 1, wherein the first arrival time and the second departure time are located between a MAC header and a frame check sequence in the second message.

9. The method of claim 1, wherein the distance is the (((first arrival time−first departure time)+(second arrival time−second departure time))*the speed of light)/2.

10. The method of claim 2, before transmitting the first message further comprising: wirelessly transmitting, by the first station, a third message to the second station, the third message indicating the first station is about to send the FTM frame to the second station.

11. The method of claim 2, wherein the first station only transmits the first message upon receipt of a third message from the second station indicating the Ack frame will include the first arrival time and the second departure time.

12. A method of determining a station distance between a first station and a second station, the method comprising:

wirelessly transmitting, by the first station, a first message including a first fine timing measurement (FTM) frame, to the second station;

measuring, by the first station, a first departure time at which the first FTM frame departed from the first station and a first arrival time at which a first acknowledgement (Ack) frame arrived at the first station from the second station in response to the first message;

wirelessly transmitting, by the first station, a second message including a second FTM frame, to the second station;

wirelessly receiving, by the first station, a third message from the second station in response to the second message, the third message including a second Ack frame comprising a second arrival time at which the first FTM frame arrived at the second station and a second departure time at which the first Ack frame departed from the second station; and determining, by the first station, the distance from the first departure time, the first arrival time, the received second arrival time and the received second departure time, wherein the FTM frame is an IEEE 802.11 fine timing measurement (FTM) frame modified to exclude a time of departure (TOD) field and a time of arrival (TOA) field.

13. The method of claim 12, wherein the second Ack frame is an IEEE 802.11 Ack frame that is modified to include a time of departure TOD field and a time of arrival TOA field.

14. The method of claim 13, wherein the TOD field stores the second departure time and the TOA field stores the second arrival time.

15. A device configured to determine a station distance between the device and a station, the comprising:

a transmitter configured to wirelessly transmit a first message including a message frame, to the station;

a receiver configured to wirelessly receive a second message from the station in response to the first message, the second message comprising an acknowledgement (Ack) frame including a first arrival time at which the message frame arrived at the station and a first departure time at which the Ack frame departed from the station; and a processor configured to determine a second departure time at which the message frame departed from the device, extract the first arrival time and the first departure time from the Ack frame, determine a second arrival time at which the Ack frame arrived at the device, and calculate the distance using the received first arrival time, the received first departure time, the determined second departure time, and the second determined arrival time, wherein the message frame is an IEEE 802.11 fine timing measurement (FTM) frame modified to exclude a time of departure (TOD) field and a time of arrival (TOA) field.

16. The device of claim 15, wherein the IEEE 802.11 FTM frame is further modified to exclude at least one Dialog Token field.

17. The device of claim 15, wherein the Ack frame is an IEEE 802.11 Ack frame that is modified to include a time of departure TOD field storing the first departure time and a time of arrival TOA field storing the first arrival time.

18. The device of claim 15, wherein the first arrival time and the second departure time are located between a MAC header and a frame check sequence in the second message.

* * * * *